April 14, 1964  R. RICHOUX  3,128,637
FLEXIBLE CONTROL DEVICE
Filed March 23, 1959  2 Sheets-Sheet 1
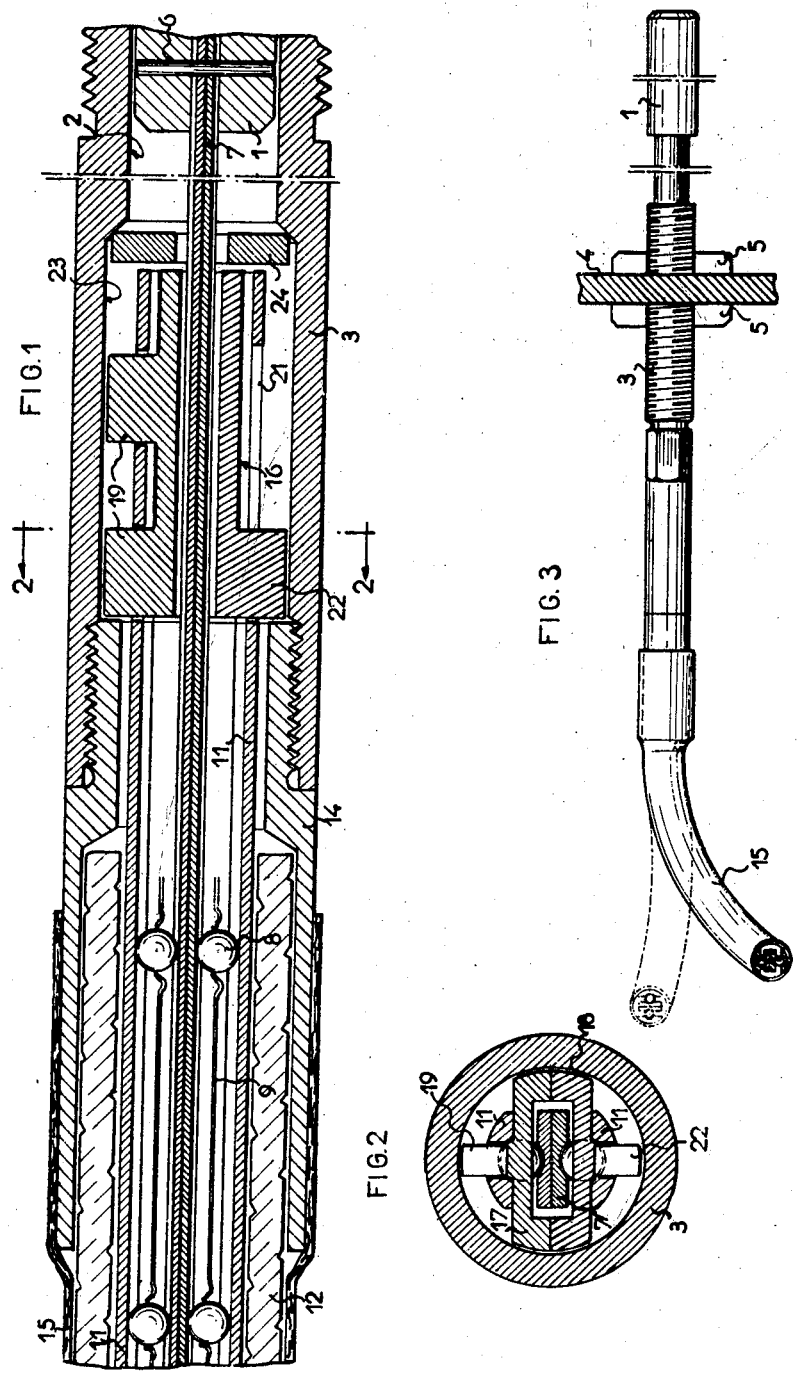

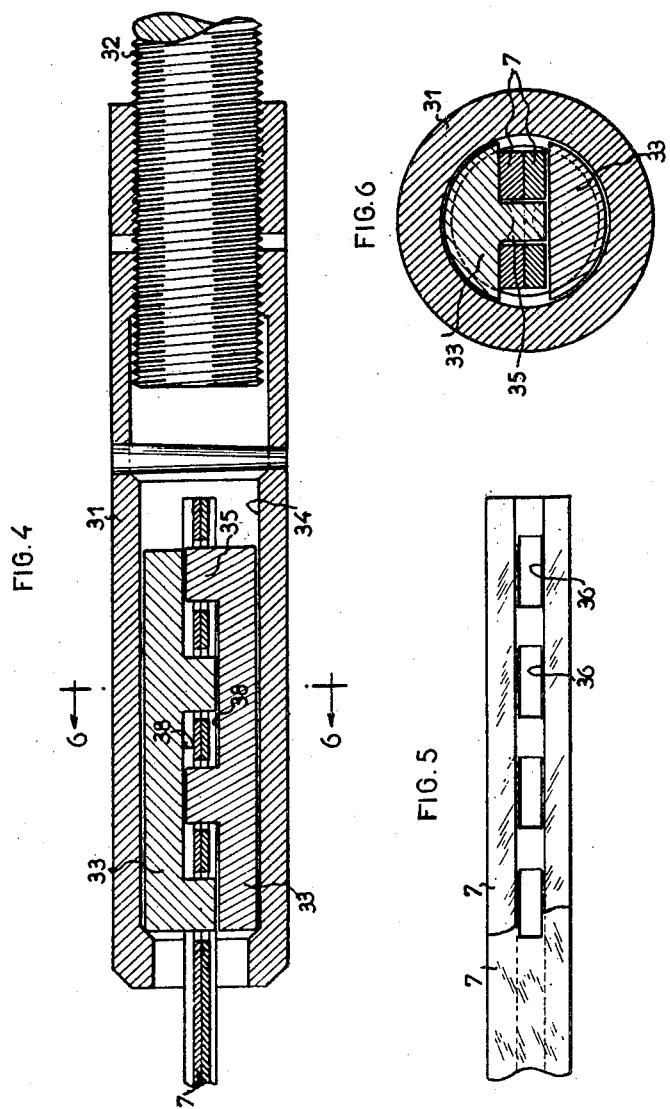

United States Patent Office 3,128,637
Patented Apr. 14, 1964

3,128,637
FLEXIBLE CONTROL DEVICE
Raymond Richoux, 3 Rue René Boulanger, Paris, France
Filed Mar. 23, 1959, Ser. No. 801,171
Claims priority, application France Mar. 25, 1958
16 Claims. (Cl. 74—501)

This invention relates to remote flexible tubular control devices, for transmitting traction and/or compression forces.

More particularly, the invention is concerned with control devices of a type consisting essentially of a flexible tubular sheath along the axis of which is arranged a flexible flat force transmitting core capable of being displaced in relation to said sheath preferably between two rows of balls or similar rolling elements which are in contact, on the one hand, with said core and, on the other hand, with two flexible fixed rails applied opposite one another against the internal face of said sheath.

In the known control devices of this type, the two extremities of the rails are attached to end fasteners which are in turn fixed to the frame-work of the machine to which the control device is fitted, whereas the two extremities of the flat core are respectively fixed to two sliding rods mounted in the axis of said end fasteners and coupled to the parts transmitting the drive, or that have to be driven.

The control device as a whole can take up a configuration either curved or sinuous, but every element of the curve will be located in a plane which is the plane passing through the two rows of balls, in other words the plane mid-perpendicular to the flat core and to the rails. Since the rails are attached to the end fasteners, it is then necessary to provide them with the same orientation that corresponds to that of the plane in which it is desired to curve the corresponding extremity of the device. However, this is not always possible because the end fasteners are not always adapted to be oriented. In addition, the free extremity of each sliding rod is normally screwed into the part transmitting the drive, or the corresponding part being driven and this means that, if said sliding rod is not screwed in sufficiently tightly, a torsional strain will be imposed on that part of the flat core which extends between the sliding rod and a few first balls, since that part of the core which extends between the balls is held against rotation by the balls that are themselves held by the rails, the extremities of which are fixed into the end fasteners of the control device, An object of the invention is to remedy the aforesaid defects of known flexible control devices.

To this end, according to the invention, the extremities of the rails are attached to a sleeve which can turn freely inside the corresponding end fastener.

Due to this arrangement, even when the control device is completely fixed at one of its extremities, it is still possible to curve it in any plane passing through the axis of the end fastener that is already fixed, since the whole assembly constituted by the core, the sliding rods, the balls, the rails and the sleeves to which they are attached, can freely pivot in the interior of the sheath. In addition, there is no longer any danger of imposing any torsional stress on the core when the sliding rods are screwed into the parts transmitting the drive, or that to be driven, because the rails then can rotate together with the core.

It is clear that the rotary sleeve to which the rails are attached must be positioned longitudinally in the end fastener. To this end, in one embodiment of the invention, the end fastener is formed of two tubular pieces, one screwed in as an extension of the other, one of these pieces being threaded onto the corresponding extremity of the sheath, whilst the other enclosing the rotary sleeve into which the rails, and the sliding rod transmitting the drive, are fixed.

In a particular structure according to the invention, the rotary sleeve holding the rails is composed of two half shells of which the plane of the joint is diametrical, which facilitates the assembling of the control device.

In order to reduce as far as possible the overall diameter of the control device, while at the same time giving the sliding rods a relatively large diameter, the different elements of the control device are arranged and dimensioned in such a way that the sliding rod never penetrates into the interior of the rotary sleeve to which the rails are fastened. It is thus possible to bring the two rails close to one another and consequently avoid their buckling under compression, since they will be coming into contact against the core as soon as their deflection becomes considerable, and also avoid their being given a material apparent difference of length when the control device is given a curved configuration resulting from the relative angle between the control rods at the ends of the device. One can thus reduce the amount of the longitudinal play which it is necessary to leave between the rails and their parts of attachment onto the sleeve, in order to take into account exactly the differences in the radii of curvature because of the fact that one of the rails is on the interior side of the curve, and the other rail on the exterior side.

In another embodiment of the invention, at least one of the extremities of the core of the control device is attached to the corresponding sliding rod, by means of a part which can freely pivot in relation to said rod, around its axis.

Due to this arrangement, the general plane of the flat section that constitutes the core of the control device is free to take up the orientation required by virtue of the curvature of the sheath, whatever may be the orientation given to the sliding rod that is integral with the driving part, or the part being driven.

In one form of the invention, the aforesaid pivoting part for fastening of the core is formed of two half-shells having a cylindrical outer surface and positioned in a bore of a part of the sliding rod, each one of the two half-shells presenting a flat face adapted to bear against the corresponding face of the core, one at least of the two half-shells being provided on its flat face with protruding portions adapted to engage corresponding perforations in the core.

In a preferred embodiment, the two half-shells are identical and positioned head-to-foot, the protruding portion of one half-shell being arranged in the spaces between the protruding portions of the other.

In embodiments where the core is composed of two flat sections applied one against the other, it will be seen that it is necessary to leave a certain longitudinal play between the aforesaid protruding portions and the perforations of the sections, in order to permit them to slide slightly in respect to each other and to take up the general curvature of the control device while offering less resistance to deflection, and to adapt themselves better to differences in the radii of curvature and to changes in direction.

The ends of the core can be made integral with the fastening parts, for example by riveting or welding, more particularly in the case where the core comprises only one angle section.

This arrangement, which permits a free orientation of the core in relation to the sliding rod, is applicable not only to control devices intended to transmit traction forces, but also to those control devices intended to transmit in addition compression forces.

Other objects and advantages of the invention will be hereinafter described with reference to the accompanying drawings, given merely by way of example.

In the drawings:

FIG. 1 is a longitudinal section of one extremity of a control device with the improvements according to the invention;

FIG. 2 is a section along the line 2—2 in FIG. 1;

FIG. 3 is an exterior view, on a smaller scale, corresponding to FIG. 1;

FIG. 4 is an axial section of one extremity of a control device adapted to transmit traction forces only;

FIG. 5 is a plan view corresponding to the extremity of the core only of the control device, and FIG. 6 is on a larger scale, a section along the line 6—6 in FIG. 4.

Referring now to FIGS. 1–3 of the accompanying drawings, the two extremities of the flexible control device represented in the drawings are identical. Each extremity consists of a rod 1 adapted to be fixed onto a part transmitting the drive or on a part which has to be driven. The rod 1 is fastened in such a way so as to be able to slide and turn in a bore 2 of a part of an end fastener or tubular member 3 which holds the corresponding end of the control device. This end fastener, in the example shown, is threaded and extends through a hole in a framework 4 with which it is made integral, in such a way that it can be adjusted by means of the two nuts 5 screwed onto said end fastener.

The inner extremity of the sliding rod 1 is connected, for example, by means of one or more cotterpins 5, with a longitudinally reciprocable flat traction or compression force transmitting band or core 7. The outer faces of the two elements of the core each have a centrally located groove in which rolling bodies or balls 8 can roll, and the spacing between the balls is maintained by a cage 9. Two rails or flat guides 11 are provided, one of the rails 11 being provided on each of the sides of the two lines of balls and in contact with them, the two rails 11 each also having a longitudinal groove in which the balls run.

The two rails or flat guides are enclosed in a sheath 12 which is, for instance, a flexible metallic sheath. The extremity of the sheath is housed in the interior of a cylindrical cap 14 screwed into the extremity of the end fastener 3. The sheath 12 is covered by another sheath 15 which may be, for example, an impervious sheath of plastic material, the extremity of which is either forced over the outside of the cap 14, or gripped on the inside thereof.

The extremities of the rails 11 are attached to a sleeve or anchoring member 16 which, for reasons of ease of assembly, is composed of two half-shells 17 and 18, see FIG. 2, the plane of the joint therebetween being diametrical. The core 7 runs freely through the sleeve 16 along a conduit defined by the interior of the two half-shells, having in cross-section a rectangular shape, which provides a suitable orientation in relation to the rails. The sleeve 16 is mounted in such a way that it can pivot freely inside the end fastener 3. One of the rails is attached, with practically no play, to two lugs 19 of the rotary sleeve 16, while the other rail has a cut out part 21, of elongated form, engaging a lug 22 of the sleeve, which lug is much shorter than said cut out part. This provides a connection with longitudinal play between the rail and the sleeve to allow the whole of the control device to be curved, while taking into account the differences of radii of curvature of the two rails. The rotary sleeve 16 is housed in a bore 23 of a part of the end fastener, which bore has a diameter larger than that of the diameter of the bore 2 of the same end fastener, and the sleeve is held in position longitudinally, on the one hand, by the adjacent extremity of the cap 14 and, on the other hand, by a washer 24 which bears against the shoulder which forms an extremity of the aforesaid bore 23, said washer freely accommodating the core 7.

It will be understood that, under these conditions, the sheaths of the control device are maintained positively at their two extremities, by the end fastener 3, while the assembly formed by the sliding rods 1, the core 7, the balls 8, the cages 9, the rails 11 and the rotary sleeve 16, can rotate freely around its own axis in the interior of the sheaths. In addition, the core 7 can naturally slide longitudinally between the rails, held by the two rows of balls, and transmit, to one of the sliding rods, the forces of traction, or compression, that it receives from the other sliding rod.

It will be observed that the sliding rod 1 never penetrates between the two rails 11, which thus permits the rails to be brought as close together as desired. This also permits using a sliding rod of a large diameter and which is, therefore, quite strong.

In addition, the fact that the rotary sleeve to which the rails are attached is a part distinct from the end fastener makes it possible to give the sleeve a constant cross-section along its full length. This facilitates its manufacture by enabling it to be severed in sections from a bar.

In the embodiment described above, the core consists of two flat strips juxtaposed against each other, but the invention is also applicable to control devices of which the core is made of a single piece.

In the above, it has been assumed that the control device hereinabove described is intended to be submitted to both traction and compression forces. With a control device intended to receive solely traction forces, or solely compression forces, it would be sufficient to hold the rotating sleeve to which the rails are attached in position axially, in one direction only.

In FIG. 4 there is shown one extremity of a flexible control device which works solely in traction. The extremity of the core 7, which is composed of two flat sections arranged one flat against the other, is attached to the sliding rod 31 which is integral with the part 32, through the intermediation of a part formed from two half-shells 33 which can pivot around in a bore 34 of said sliding rod. The two half-shells 33 bear against the corresponding extremity of the bore 34, in the direction in which the core is submitted to the traction stresses.

The two half-shells 33 are identical, and each one has protruding portions 35 which fit into perforations 36 of a corresponding shape cut in the core 7. The two half-shells are placed head-to-foot and present flat surfaces 38 opposite each other, the protruding portions of one being located in the gaps between the protruding portions of the other.

In the particular case where the core is composed of two sections, it is preferable to allow a slight longitudinal play between the protruding portions and the perforations of the two sections of the core, in order that they can slide slightly with respect to each other, in longitudinal direction, in order to adapt themselves to the differences of radii of curvature of the control device.

The type of connection according to the invention, permitting the extremity of the flat core to be angularly displaced relatively to the rod that is sliding, or free in space, is also applicable to flexible control devices which transmit at the same time traction and compression forces, provided that the rotary attaching part be held in position in both axial direcions with respect to the sliding rod.

While the invention has been described with particular reference to preferred embodiments it is not intended to limit the scope of the invention to the embodiments illustrated, nor otherwise than the terms of the subjoined claims.

What I claim is:

1. A tubular remote control device for transmitting traction or compression forces comprising a flexible tubular sheath, a flat flexible band adapted to move to and fro in said sheath, a pair of flexible flat elongated guiding members arranged opposite each other on either side of said band in said sheath for guiding said band, spaced rolling elements between said members and said band, a tubular end fastener secured at each end of said sheath, a sleeve rotatably mounted in each of said tubular end fasteners and prevented against axial movement therein at least in one direction, means on said sleeve for connection to said elongated guiding members, each end portion of said band protruding axially through the associated one of said sleeves to permit transmission of forces from one end of said device to the other.

2. A tubular remote control device as claimed in claim 1 wherein said tubular end fastener consists of two aligned parts secured to each other, one of said parts being secured to said sheath and the other part enclosing the associated sleeve.

3. A tubular remote control device as claimed in claim 2, wherein each sleeve is held in position axially in the corresponding end fastener between an extremity of said fastener part secured to the sheath and said other fastener part.

4. A tubular remote control device according to claim 1 wherein said sleeve comprises two half-shells having a diametrical common joining plane.

5. A tubular remote control device according to claim 1 further comprising a control rod rigid with each end of the associated band outwardly of said sleeve, said control rod being restricted from movement into the interior of the associated sleeve and having a diameter larger than the distance between said elongated guiding members.

6. A tubular remote control device according to claim 5 wherein said control rod is slidably mounted in the corresponding tubular end fastener.

7. A tubular remote control device according to claim 1 further comprising a control rod rigid with each end of said band in axial direction only but free to rotate relative thereto.

8. A tubular remote control device according to claim 1 further comprising a band gripping member secured to each end of said band, and a tubular control rod enclosing said gripping member and rotatable with respect thereto, said control rod being restricted against axial movement with respect to said gripping member.

9. A tubular remote control device as claimed in claim 8, wherein said gripping member comprises two half shells having a cylindrical outer surface and mounted for free pivoting movement in a corresponding cylindrical bore of said tubular control rod, each of said half-shells having a flat surface adapted to bear against said band, at least one of said half-shells having on its flat face projections adapted to engage corresponding perforations provided in the band.

10. A tubular remote control device as claimed in claim 9, wherein said two half-shells are identical and relatively positioned head-to-foot.

11. A tubular remote control device as claimed in claim 9, wherein said band is composed of two elementary bands applied flat against each other and wherein said projections are slightly shorter than said perforations in axial direction so as to allow some play in the longitudinal connection thus established.

12. The combination with a flexible tubular remote control device comprising a sheath, two flat guides extending parallely throughout said sheath, a longitudinally reciprocable flat force transmitting band between said guides in parallel relationship therewith, rolling bodies of uniform diameter in rolling engagement with said band and said guides, and cage means to limit relative displacements between the rolling bodies located on each side of said band, of a tubular member connected to an end of said sheath, an anchoring member rotatable in said tubular member and held therein against substantial axial displacements, said anchoring member being attached to said guides for rotary motion therewith about the axis of said sheath, means on said anchoring member forming an axial passage in said anchoring member, said band being adapted to slide lengthwise in said narrow passage through said anchoring member and having a terminal portion extending beyond said anchoring member towards the outer end of said tubular member, and control means connected to the terminal portion of said band extending from said anchoring member towards the outer end of said tubular member.

13. The combination as claimed in claim 12, wherein said tubular member comprises two aligned parts secured to each other, one of said parts being secured to said sheath and the other of said parts enclosing said anchoring member.

14. The combination as claimed in claim 12, wherein said anchoring member comprises two half-shells having a diametrical common joining plane.

15. The combination as claimed in claim 12, wherein said control means include a bar rotatable and longitudinally reciprocable within an outer end portion of said tubular member and connected to said terminal portion of said band for longitudinal and rotary motion therewith, said bar having a diameter larger than the distance between said two flat guides.

16. The combination as claimed in claim 15, wherein said bar comprises two half shells, each of said half shells having a cylindrical outer surface and being mounted for free rotational movement in said tubular member, each of said half shells including a flat surface portion bearing against said band, and at least one of said half shells having on said flat surface thereof projections engaging corresponding projections provided in said band.

References Cited in the file of this patent

UNITED STATES PATENTS

| | | |
|---|---|---|
| 1,864,507 | Pineau | June 21, 1932 |
| 2,034,219 | Williams | Mar. 17, 1936 |
| 2,287,968 | Broulhiet | June 30, 1942 |
| 2,372,204 | Herkert | Mar. 27, 1945 |
| 2,502,780 | Dreffein | Apr. 4, 1950 |
| 2,841,029 | Richoux | July 1, 1958 |
| 2,845,813 | Richoux | Aug. 5, 1958 |
| 2,872,793 | Botti | Feb. 10, 1959 |

FOREIGN PATENTS

| | | |
|---|---|---|
| 825,040 | France | Nov. 17, 1937 |
| 976,596 | France | Nov. 1, 1950 |